United States Patent
Morikazu

(10) Patent No.: US 9,044,819 B2
(45) Date of Patent: Jun. 2, 2015

(54) LASER PROCESSING APPARATUS

(71) Applicant: Disco Corporation, Tokyo (JP)

(72) Inventor: Hiroshi Morikazu, Tokyo (JP)

(73) Assignee: Disco Corporation, Tokyo (JP)

( * ) Notice: Subject to any disclaimer, the term of this patent is extended or adjusted under 35 U.S.C. 154(b) by 285 days.

(21) Appl. No.: 13/677,787

(22) Filed: Nov. 15, 2012

(65) Prior Publication Data

US 2013/0134142 A1    May 30, 2013

(30) Foreign Application Priority Data

Nov. 30, 2011   (JP) .................................. 2011-261578

(51) Int. Cl.
  *B23K 26/00*   (2014.01)
  *B23K 26/073*   (2006.01)

(52) U.S. Cl.
  CPC ............... *B23K 26/00* (2013.01); *B23K 26/073* (2013.01); *B23K 2201/40* (2013.01)

(58) Field of Classification Search
  CPC ... B23K 26/00; B23K 26/073; B23K 2201/40
  USPC .......................... 219/121.63, 121.67, 121.69, 219/121.71–121.73, 121.8, 121.83
  See application file for complete search history.

(56) References Cited

U.S. PATENT DOCUMENTS

2007/0181546 A1 * 8/2007 Kitai et al. ............... 219/121.83
2009/0032510 A1 * 2/2009 Ando et al. ............... 219/121.72

FOREIGN PATENT DOCUMENTS

JP        10213415 A  *  8/1998  ............ G01B 11/00
JP      2006-051517      2/2006

* cited by examiner

*Primary Examiner* — Thien S Tran
(74) *Attorney, Agent, or Firm* — Greer Burns & Crain, LTD.

(57) ABSTRACT

A laser processing apparatus includes a beam diameter adjusting unit provided between a laser oscillator and a focusing unit, an imaging unit for detecting the beam diameter of the laser beam directed to a detection path, an optical path length changing unit for moving the imaging unit along the detection path to thereby change an optical path length, and a controller for controlling the imaging unit, the beam diameter adjusting unit, and the optical path length changing unit. The controller operates to move the imaging unit to two positions where different optical path lengths are provided, detect the beam diameters of the laser beam at the two positions, and controls the beam diameter adjusting unit according to the two beam diameters detected above so that the two beam diameters have a predetermined relation.

2 Claims, 3 Drawing Sheets

LASER PROCESSING APPARATUS

BACKGROUND OF THE INVENTION

1. Field of the Invention

The present invention relates to a laser processing apparatus having a parallelism adjusting function for bringing a laser beam oscillated by a laser oscillator into a parallel beam (collimated beam) in particular.

2. Description of the Related Art

In a semiconductor device fabrication process, a plurality of crossing division lines called streets are formed on the front side of a substantially disk-shaped semiconductor wafer to thereby partition a plurality of regions where devices such as ICs and LSIs are respectively formed. The semiconductor wafer is cut along the streets to thereby divide the regions where the devices are formed from each other, thus obtaining individual semiconductor chips. Further, an optical device wafer is provided by forming photodetectors such as photodiodes or light emitting devices such as laser diodes on the front side of a sapphire substrate. The optical device wafer is also cut along the streets to obtain individual optical devices divided from each other, such as photodiodes and laser diodes, which are widely used in electric equipment.

As a method of dividing a wafer such as a semiconductor wafer and an optical device wafer along the streets, there has been put into practical use a method including the steps of applying a pulsed laser beam to the wafer along the streets to thereby form laser processed grooves on the wafer or modified layers inside the wafer along the streets and next breaking the wafer along the laser processed grooves or the modified layers. A laser processing apparatus for laser-processing a workpiece such as a wafer includes a chuck table for holding the workpiece and laser beam applying means for applying a laser beam to the workpiece held on the chuck table. The laser beam applying means includes a laser oscillator for oscillating a laser beam and focusing means for focusing the laser beam oscillated by the laser oscillator and applying the focused laser beam to the workpiece held on the chuck table (see Japanese Patent Laid-open No. 2006-51517, for example).

As described above, the laser processing apparatus for performing laser processing includes a chuck table for holding a workpiece and laser beam applying means for applying a laser beam to the workpiece held on the chuck table. The laser beam applying means includes a laser oscillator for oscillating a laser beam and a focusing lens for focusing the laser beam oscillated by the laser oscillator. In such laser beam applying means, the laser beam entering the focusing lens is preferably a parallel beam having a predetermined beam diameter. However, the laser beam oscillated by the laser oscillator has a divergence angle. Therefore, beam adjusting means for bringing the laser beam oscillated by the laser oscillator into a parallel beam is provided between the laser oscillator and the focusing lens.

SUMMARY OF THE INVENTION

The beam adjusting means is adjusted by an operator in such a manner that an optical system is exposed and a detector for detecting the beam diameter of the laser beam is moved to two positions on an optical path leading to the focusing means, thereby detecting two beam diameters at the two positions. Then, the optical system is adjusted so that the two beam diameters detected above become equal to each other. Thus, the adjustment is made by the operator to cause a reduction in workability. Further, the laser beam to be directed to the focusing lens is not always a parallel beam, but it may be decreased in diameter with a convergence angle of about 0.1 degree. Also in this case, the beam adjusting means is adjusted by the operator in such a manner that the optical system is exposed and the detector for detecting the beam diameter of the laser beam is moved to the two positions on the optical path leading to the focusing means, thereby detecting two beam diameters at the two positions. Then, the optical system is adjusted so that the two beam diameters detected above have a predetermined relation.

It is therefore an object of the present invention to provide a laser processing apparatus having an adjusting function which can easily adjust the parallelism etc. of the laser beam oscillated by the laser oscillator.

In accordance with an aspect of the present invention, there is provided a laser processing apparatus including a chuck table for holding a workpiece; laser beam applying means for applying a laser beam to the workpiece held on the chuck table, the laser beam applying means having a laser oscillator for oscillating the laser beam and focusing means for focusing the laser beam oscillated by the laser oscillator; beam diameter adjusting means provided between the laser oscillator and the focusing means for adjusting the beam diameter of the laser beam oscillated by the laser oscillator; an optical path changing mirror for changing the optical path of the laser beam passed through the beam diameter adjusting means into an optical path toward the focusing means; mirror positioning means for selectively positioning the optical path changing mirror at an operative position where the laser beam passed through the beam diameter adjusting means is directed toward the focusing means and at an inoperative position where the laser beam passed through the beam diameter adjusting means is allowed to travel straight toward a detection path; optical attenuating means provided on the detection path for attenuating the laser beam directed to the detection path; imaging means for detecting the beam diameter of the laser beam attenuated by the optical attenuating means; optical path length changing means for moving the imaging means along the detection path to thereby change an optical path length; and control means for controlling the imaging means, the beam diameter adjusting means, and the optical path length changing means; wherein the control means operates the optical path length changing means to move the imaging means to two positions where different optical path lengths are provided, next operates the imaging means at the two positions to detect the beam diameters of the laser beam at the two positions, and next controls the beam diameter adjusting means according to the two beam diameters detected above so that the two beam diameters have a predetermined relation.

Preferably, the predetermined relation of the two beam diameters includes that the two beam diameters are equal to each other.

As described above, the laser processing apparatus according to the present invention includes the beam diameter adjusting means provided between the laser oscillator and the focusing means, the optical path changing mirror for changing the optical path of the laser beam passed through the beam diameter adjusting means into an optical path toward the focusing means, the mirror positioning means for selectively positioning the optical path changing mirror at the operative position where the laser beam passed through the beam diameter adjusting means is directed toward the focusing means and at the inoperative position where the laser beam passed through the beam diameter adjusting means is allowed to travel straight toward the detection path, the optical attenuating means provided on the detection path for attenuating the laser beam directed to the detection path, the imaging means for detecting the beam diameter of the laser beam attenuated by the optical attenuating means, the optical path length changing means for moving the imaging means along the detection path to thereby change an optical path length, and the control means for controlling the imaging means, the beam diameter adjusting means, and the optical path length changing means. The control means operates the optical path length changing means to move the imaging means to the two positions where different optical path lengths are provided, next operates the imaging means at the two positions to detect the beam diameters of the laser beam at the two positions, and next controls the beam diameter adjusting means according to the two beam diameters detected above so that the two beam diameters have the predetermined relation. Accordingly, the operator is not required to conduct the work for correcting the laser beam oscillated by the laser oscillator to a parallel beam, thereby improving the workability.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENT

Figure 1:
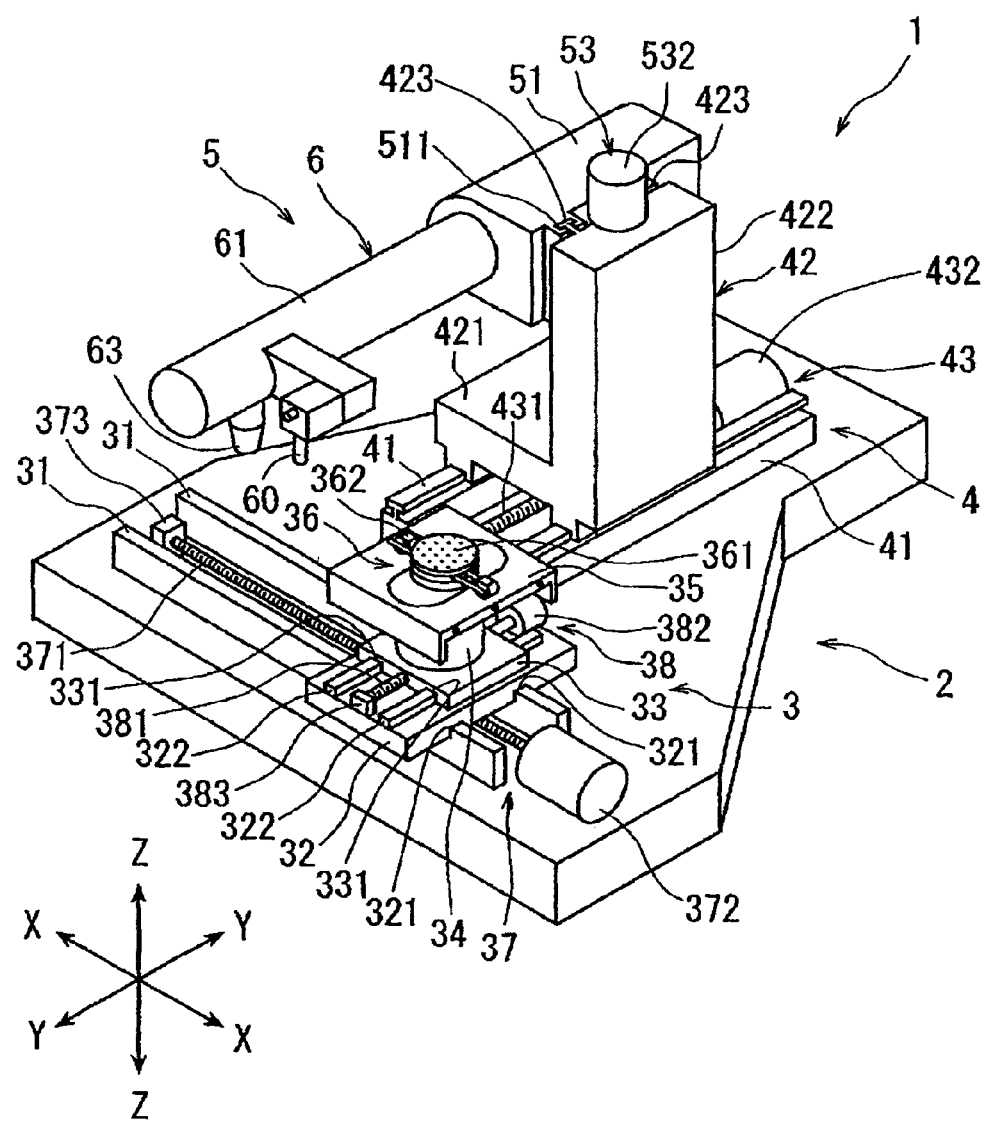
FIG. 1 is a perspective view of a laser processing apparatus according to a preferred embodiment of the present invention.

A preferred embodiment of the laser processing apparatus according to the present invention will now be described in detail with reference to the attached drawings. FIG. 1 is a perspective view of a laser processing apparatus 1 according to a preferred embodiment of the present invention. The laser processing apparatus 1 shown in FIG. 1 includes a stationary base 2, a chuck table mechanism 3 for holding a workpiece, the chuck table mechanism 3 being provided on the stationary base 2 so as to be movable in a feeding direction (X direction) shown by an arrow X, a laser beam applying unit supporting mechanism 4 provided on the stationary base 2 so as to be movable in an indexing direction (Y direction) shown by an arrow Y perpendicular to the X direction, and a laser beam applying unit 5 provided on the laser beam applying unit supporting mechanism 4 so as to be movable in a focal position adjusting direction (Z direction) shown by an arrow Z.

The chuck table mechanism 3 includes a pair of guide rails 31 provided on the stationary base 2 so as to extend parallel to each other in the X direction, a first slide block 32 provided on the guide rails 31 so as to be movable in the X direction, a second slide block 33 provided on the first slide block 32 so as to be movable in the Y direction, a cover table 35 supported by a cylindrical member 34 standing on the second slide block 33, and a chuck table 36 as workpiece holding means. The chuck table 36 has a vacuum chuck 361 formed of a porous material. A workpiece such as a disk-shaped semiconductor wafer is adapted to be held under suction on the upper surface (holding surface) of the vacuum chuck 361 by operating suction means (not shown). The chuck table 36 is rotatable by a pulse motor (not shown) provided in the cylindrical member 34. Further, the chuck table 36 is provided with clamps 362 for fixing an annular frame to be hereinafter described.

The lower surface of the first slide block 32 is formed with a pair of guided grooves 321 for slidably engaging the pair of guide rails 31 mentioned above. A pair of guide rails 322 are provided on the upper surface of the first slide block 32 so as to extend parallel to each other in the Y direction. Accordingly, the first slide block 32 configured as above is movable in the X direction along the guide rails 31 by the slidable engagement of the guided grooves 321 with the guide rails 31. The chuck table mechanism 3 further includes feeding means 37 for moving the first slide block 32 in the X direction along the guide rails 31. The feeding means 37 includes an externally threaded rod 371 extending parallel to the guide rails 31 so as to be interposed therebetween and a pulse motor 372 as a drive source for rotationally driving the externally threaded rod 371. The externally threaded rod 371 is rotatably supported at one end thereof to a bearing block 373 fixed to the stationary base 2 and is connected at the other end to the output shaft of the pulse motor 372 so as to receive the torque thereof. The externally threaded rod 371 is engaged with a tapped through hole formed in an internally threaded block (not shown) projecting from the lower surface of the first slide block 32 at a central portion thereof. Accordingly, the first slide block 32 is moved in the X direction along the guide rails 31 by operating the pulse motor 372 to normally or reversely rotate the externally threaded rod 371.

The lower surface of the second slide block 33 is formed with a pair of guided grooves 331 for slidably engaging the pair of guide rails 322 provided on the upper surface of the first slide block 32 as mentioned above. Accordingly, the second slide block 33 is movable in the Y direction along the guide rails 322 by the slidable engagement of the guided grooves 331 with the guide rails 322. The chuck table mechanism 3 further includes first indexing means 38 for moving the second slide block 33 in the Y direction along the guide rails 322 provided on the first slide block 32. The first indexing means 38 includes an externally threaded rod 381 extending parallel to the guide rails 322 so as to be interposed therebetween and a pulse motor 382 as a drive source for rotationally driving the externally threaded rod 381. The externally threaded rod 381 is rotatably supported at one end thereof to a bearing block 383 fixed to the upper surface of the first slide block 32 and is connected at the other end to the output shaft of the pulse motor 382 so as to receive the torque thereof. The externally threaded rod 381 is engaged with a tapped through hole formed in an internally threaded block (not shown) projecting from the lower surface of the second slide block 33 at a central portion thereof. Accordingly, the second slide block 33 is moved in the Y direction along the guide rails 322 by operating the pulse motor 382 to normally or reversely rotate the externally threaded rod 381.

The laser beam applying unit supporting mechanism 4 includes a pair of guide rails 41 provided on the stationary base 2 so as to extend parallel to each other in the Y direction and a movable support base 42 provided on the guide rails 41 so as to be movable in the Y direction. The movable support base 42 is composed of a horizontal portion 421 slidably supported to the guide rails 41 and a vertical portion 422 extending vertically upward from the upper surface of the horizontal portion 421. Further, a pair of guide rails 423 are provided on one side surface of the vertical portion 422 so as to extend parallel to each other in the Z direction. The laser beam applying unit supporting mechanism 4 further includes second indexing means 43 for moving the movable support base 42 in the Y direction along the guide rails 41. The second indexing means 43 includes an externally threaded rod 431 extending parallel to the guide rails 41 so as to be interposed therebetween and a pulse motor 432 as a drive source for rotationally driving the externally threaded rod 431. The externally threaded rod 431 is rotatably supported at one end thereof to a bearing block (not shown) fixed to the stationary base 2 and is connected at the other end to the output shaft of the pulse motor 432 so as to receive the torque thereof. The externally threaded rod 431 is engaged with a tapped through hole formed in an internally threaded block (not shown) projecting from the lower surface of the horizontal portion 421 at a central portion thereof. Accordingly, the movable support base 42 is moved in the Y direction along the guide rails 41 by operating the pulse motor 432 to normally or reversely rotate the externally threaded rod 431.

The laser beam applying unit 5 includes a unit holder 51 and laser beam applying means 6 mounted to the unit holder 51. The unit holder 51 is formed with a pair of guided grooves 511 for slidably engaging the pair of guide rails 423 provided on the vertical portion 422. Accordingly, the unit holder 51 is supported so as to be movable in the Z direction by the slidable engagement of the guided grooves 511 with the guide rails 423.

The laser beam applying unit 5 further includes focal position adjusting means 53 for moving the unit holder 51 along the guide rails 423 in the Z direction. The focal position adjusting means 53 includes an externally threaded rod (not shown) extending parallel to the guide rails 423 so as to be interposed therebetween and a pulse motor 532 as a drive source for rotationally driving this externally threaded rod. Accordingly, the unit holder 51 and the laser beam applying means 6 are moved in the Z direction along the guide rails 423 by operating the pulse motor 532 to normally or reversely rotate this externally threaded rod. In this preferred embodiment, when the pulse motor 532 is normally operated, the laser beam applying means 6 is moved upward, whereas when the pulse motor 532 is reversely operated, the laser beam applying means 6 is moved downward.

Figure 2:
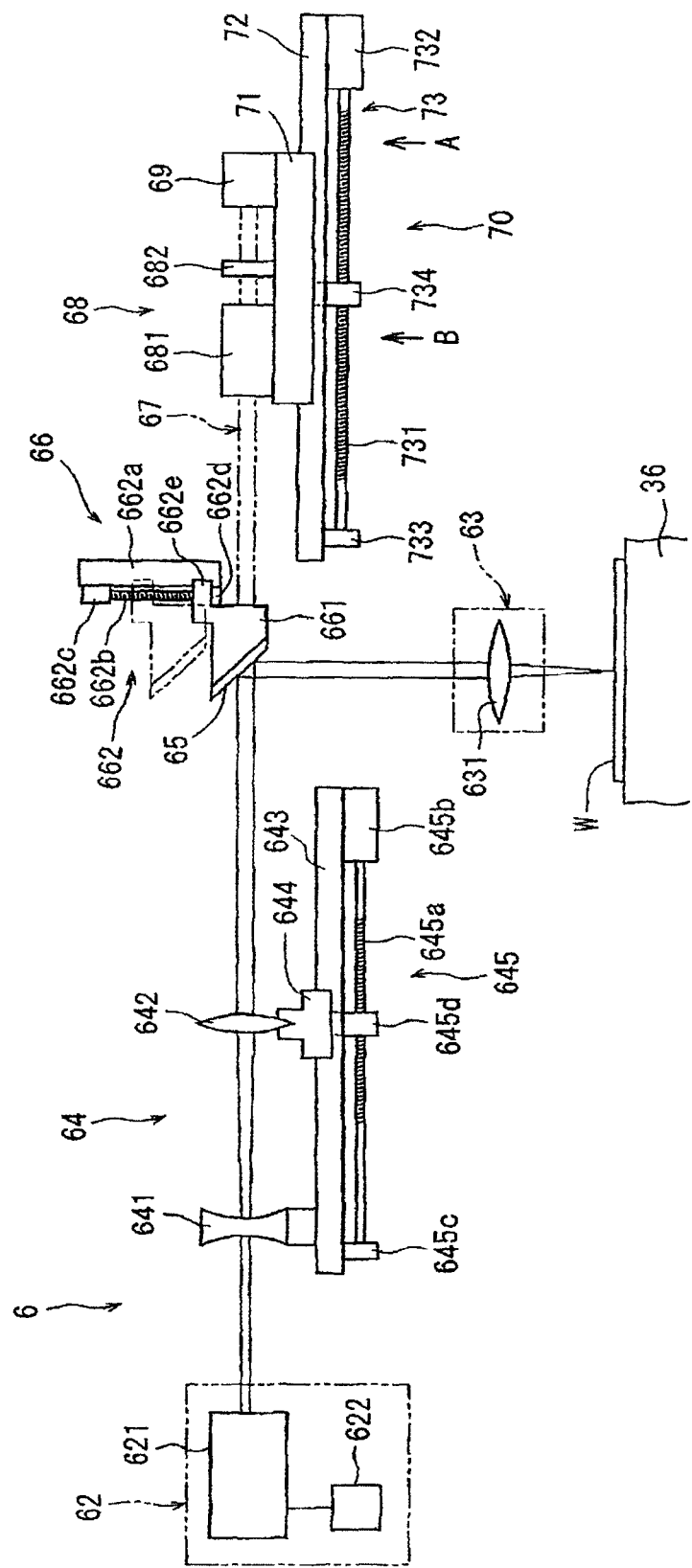
FIG. 2 is a schematic block diagram showing the configuration of laser beam applying means included in the laser processing apparatus shown in FIG. 1.

The laser beam applying means 6 includes a cylindrical casing 61 extending from the unit holder 51 in a substantially horizontal direction. As shown in FIG. 2, the laser beam applying means 6 includes pulsed laser beam oscillating means 62 provided in the casing 61 and focusing means 63 provided in the casing 61. The focusing means 63 includes an objective focusing lens 631 for focusing a pulsed laser beam oscillated by the pulsed laser beam oscillating means 62. The pulsed laser beam oscillating means 62 is composed of a pulsed laser oscillator 621 such as a YAG laser oscillator or a YVO4 laser oscillator and repetition frequency setting means 622 connected to the pulsed laser oscillator 621. The pulsed laser beam oscillating means 62 functions to oscillate a pulsed laser beam having a diameter of 3 mm in the embodiment of the drawings. The focusing means 63 functions to apply the pulsed laser beam oscillated by the pulsed laser beam oscillating means 62 to a workpiece W held on the chuck table 36.

Referring again to FIG. 2, the laser beam applying means 6 further includes beam diameter adjusting means 64 provided between the pulsed laser beam oscillating means 62 and the focusing means 63 for adjusting the beam diameter of the pulsed laser beam oscillated by the pulsed laser beam oscillating means 62, an optical path changing mirror 65 for changing the optical path of the pulsed laser beam passed through the beam diameter adjusting means 64 into an optical path toward the focusing means 63, and mirror positioning means 66 for selectively positioning the optical path changing mirror 65 at an operative position shown by a solid line in FIG. 2 and at an inoperative position shown by a phantom line in FIG. 2.

The beam diameter adjusting means 64 includes a first lens 641 provided by a concave lens having a focal length $f1=-50$ mm and a second lens 642 provided by a convex lens having a focal length $f2=+100$ mm. The second lens 642 is spaced by a distance $L=100$ mm from the first lens 641. The first lens 641 is provided on a support base 643 extending along the optical axis of the first lens 641 (in the horizontal direction as viewed in FIG. 2). The second lens 642 is mounted on a movable base 644 provided on the support base 643 so as to be movable along the optical axis of the second lens 642. The beam diameter adjusting means 64 further includes moving means 645 for moving the movable base 644 mounting the second lens 642 thereon along the optical axis of the second lens 642 (in the horizontal direction as viewed in FIG. 2). The moving means 645 includes an externally threaded rod 645*a* extending parallel to the support base 643 and a pulse motor 645*b* as a drive source for rotationally driving the externally threaded rod 645*a*. The externally threaded rod 645*a* is rotatably supported at one end thereof to a bearing block 645*c* fixed to the support base 643 and is connected at the other end to the output shaft of the pulse motor 645*b* so as to receive the torque thereof. The externally threaded rod 645*a* is engaged with a tapped through hole formed in an internally threaded block 645*d* mounted on the movable base 644. Accordingly, the movable base 644 mounting the second lens 642 thereon is moved along the support base 643 by operating the pulse motor 645*b* to normally or reversely rotate the externally threaded rod 645*a*. The amount of movement of the movable base 644 mounting the second lens 642 thereon per drive pulse to be applied to the pulse motor 645*b* is set to 1 μm, for example. The pulse motor 645*b* of the moving means 645 is controlled by control means to be hereinafter described.

The optical path changing mirror 65 functions to change the optical path of the pulsed laser beam oscillated by the pulsed laser beam oscillating means 62 and passed through the beam diameter adjusting means 64 into an optical path directed downward toward the focusing means 63 as viewed in FIG. 2. The mirror positioning means 66 for selectively positioning the optical path changing mirror 65 at the operative position shown by the solid line in FIG. 2 and at the inoperative position shown by the phantom line in FIG. 2 is composed of a mirror supporting member 661 for supporting the optical path changing mirror 65 and moving means 662 for moving the mirror supporting member 661 in a vertical direction as viewed in FIG. 2. The moving means 662 includes a support base 662*a* extending in the vertical direction, an externally threaded rod 662*b* extending vertically parallel to the support base 662*a*, and a pulse motor 662*c* as a drive source for rotationally driving the externally threaded rod 662*b*. The externally threaded rod 662*b* is rotatably supported at one end thereof to a bearing block 662*d* fixed to the support base 662*a* and is connected at the other end to the output shaft of the pulse motor 662*c* so as to receive the torque thereof. The externally threaded rod 662*b* is engaged with a tapped through hole formed in an internally threaded block 662*e* mounted on the mirror supporting member 661. Accordingly, the mirror supporting member 661 supporting the optical path changing mirror 65 is moved vertically along the support base 662*a* by operating the pulse motor 662*c* to normally or reversely rotate the externally threaded rod 662*b*. When the mirror supporting member 661 supporting the optical path changing mirror 65 is moved to the operative position by the moving means 662, the pulsed laser beam oscillated by the pulsed laser beam oscillating means 62 and passed through the beam diameter adjusting means 64 is directed toward the focusing means 63 by the optical path changing mirror 65. In contrast, when the mirror supporting member 661 supporting the optical path changing mirror 65 is moved to the inoperative position by the moving means 662, the pulsed laser beam oscillated by the pulsed laser beam oscillating means 62 and passed through the beam diameter adjusting means 64 is allowed to travel straight toward a detection path 67.

As shown in FIG. 2, the laser beam applying means 6 further includes optical attenuating means 68 provided on the detection path 67 for attenuating the pulsed laser beam directed to the detection path 67, imaging means 69 for detecting the beam diameter of the pulsed laser beam attenuated by the optical attenuating means 68, and optical path length changing means 70 for moving the imaging means 69 along the detection path 67 to thereby change an optical path length. In the embodiment, the optical attenuating means 68 is composed of a beam attenuator 681 and an ND filter 682 and the imaging means 69 is configured by an imaging device (CCD), and an image signal output from the imaging means 69 is transmitted to control means to be hereinafter described. The optical path length changing means 70 includes a movable base 71 on which the optical attenuating means 68 composed of the beam attenuator 681 and the ND filter 682 and the imaging means 69 are provided, a support base 72 for movably supporting the movable base 71 along the detection path 67, and moving means 73 for moving the movable base 71 along the support base 72. The moving means 73 includes an externally threaded rod 731 extending parallel to the support base 72 and a pulse motor 732 as a drive source for rotationally driving the externally threaded rod 731. The externally threaded rod 731 is rotatably supported at one end thereof to a bearing block 733 fixed to the support base 72 and is connected at the other end to the output shaft of the pulse motor 732 so as to receive the torque thereof. The externally threaded rod 731 is engaged with a tapped through hole formed in an internally threaded block 734 mounted on the movable base 71. Accordingly, the movable base 71 mounting the optical attenuating means 68 and the imaging means 69 thereon is moved along the support base 72 by operating the pulse motor 732 to normally or reversely rotate the externally threaded rod 731. The pulse motor 732 of the moving means 73 thus configured is controlled by control means to be hereinafter described.

Referring back to FIG. 1, alignment means 60 for detecting a subject area to be laser-processed by the laser beam applying means 6 is provided on the casing 61 constituting the laser beam applying means 6. The alignment means 60 is configured by an imaging device (CCD) or the like, and an image signal output from the alignment means 60 is transmitted to control means to be hereinafter described.

Figure 3:
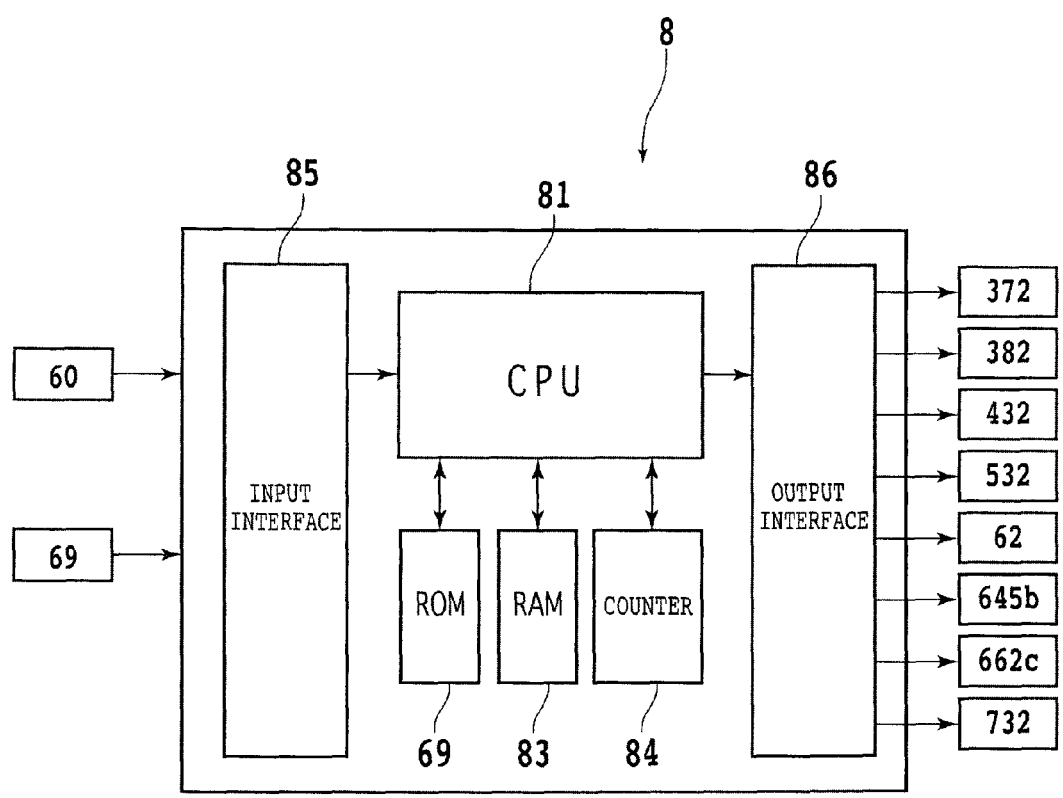
FIG. 3 is a block diagram of control means included in the laser processing apparatus shown in FIG. 1.

The laser processing apparatus 1 shown in FIG. 1 further includes control means 8 shown in FIG. 3. The control means 8 is configured by a computer, and it includes a central processing unit (CPU) 81 for performing operational processing according to a control program, a read only memory (ROM) 82 preliminary storing the control program, a random access memory (RAM) 83 for storing the results of computation, etc., a counter 84, an input interface 85, and an output interface 86. Detection signals from the alignment means 60 and the imaging means 69 are input into the input interface 85 of the control means 8. On the other hand, control signals are output from the output interface 86 of the control means 8 to the pulse motor 372 constituting the feeding means 37, the pulse motor 382 constituting the first indexing means 38, the pulse motor 432 constituting the second indexing means 43, the pulse motor 532 constituting the focal position adjusting means 53, the pulsed laser beam oscillating means 62 of the laser beam applying means 6, the pulse motor 645*b* constituting the moving means 645 of the beam diameter adjusting means 64, the pulse motor 662*c* constituting the moving means 662 of the mirror positioning means 66, and the pulse motor 732 constituting the moving means 73 of the optical path length changing means 70.

The operation of the laser processing apparatus configured above will now be described. In the case that the pulsed laser beam (having a diameter of 3 mm) oscillated by the pulsed laser beam oscillating means 62 is a parallel beam, the pulsed laser beam passed through the beam diameter adjusting means 64 becomes a parallel beam having a diameter of 6 mm provided that the first lens 641 and the second lens 642 are arranged as mentioned above. However, the pulsed laser beam oscillated by the pulsed laser beam oscillating means 62 is a substantially parallel beam, but it tends to increase or decrease in diameter. Accordingly, in the case that the pulsed laser beam oscillated by the pulsed laser beam oscillating means 62 is not a parallel beam, it must be corrected to a parallel beam. There will now be described a method of detecting whether or not the pulsed laser beam oscillated by the pulsed laser beam oscillating means 62 is a parallel beam and correcting the pulsed laser beam to a parallel beam if it is not a parallel beam by referring mainly to FIG. 2.

First, the control means 8 operates the pulse motor 662*c* constituting the moving means 662 of the mirror positioning means 66 to move the mirror supporting member 661 supporting the optical path changing mirror 65 to the inoperative position shown by the phantom line in FIG. 2. Further, the control means 8 also operates the pulse motor 732 constituting the moving means 73 of the optical path length changing means 70 to move the imaging means 69 to a first detecting position shown by an arrow A in FIG. 2. After thus moving the optical path changing mirror 65 to the inoperative position and moving the imaging means 69 to the first detecting position A, the control means 8 operates the pulsed laser beam oscillating means 62 to oscillate the pulsed laser beam. As a result, the pulsed laser beam oscillated by the pulsed laser beam oscillating means 62 is passed through the beam diameter adjusting means 64 and led to the detection path 67. On the detection path 67, the pulsed laser beam is attenuated by the optical attenuating means 68 composed of the beam attenuator 681 and the ND filter 682 to finally reach the imaging means 69. The imaging means 69 images the light received and then transmits an image signal to the control means 8. The control means 8 temporarily stores in the random access memory (RAM) 83 the image signal transmitted from the imaging means 69 as a first detection signal DA. Thereafter, the control means 8 operates the pulse motor 732 constituting the moving means 73 of the optical path length changing means 70 to move the imaging means 69 to a second detecting position shown by an arrow B in FIG. 2. The control means 8 receives an image signal output from the imaging means 69, and temporarily stores in the random access memory (RAM) 83 this image signal as a second detection signal DB.

After thus temporarily storing the first detection signal DA and the second detection signal DB in the random access memory (RAM) 83, the control means 8 obtains a beam diameter φA according to the first detection signal DA and a beam diameter φB according to the second detection signal DB (beam diameter detecting step). Then, the control means 8 checks whether or not the beam diameter φA and the beam diameter φB are equal to each other or in a predetermined relation (for example, in a predetermined relation such that the pulsed laser beam passed through the beam diameter adjusting means 64 and led to the detection path 67 is reduced in diameter with a convergence angle of 0.1 degree). In the case that the beam diameter φA and the beam diameter φB are equal to each other or in the predetermined relation, the control means 8 determines that the pulsed laser beam oscillated by the pulsed laser beam oscillating means 62 is a parallel beam or in the predetermined relation, and then stops the operation of the pulsed laser beam oscillating means 62. Further, the control means 8 operates the pulse motor 662c constituting the moving means 662 of the mirror positioning means 66 to move the mirror supporting member 661 supporting the optical path changing mirror 65 to the operative position shown by the solid line in FIG. 2.

In the case that the beam diameter φA and the beam diameter φB are not equal to each other or not in the predetermined relation, the control means 8 checks whether or not the beam diameter φA is larger than the beam diameter φB. If the beam diameter φA is larger than the beam diameter φB, the control means 8 determines that the pulsed laser beam oscillated by the pulsed laser beam oscillating means 62 is increased in diameter. Accordingly, the control means 8 performs a diameter decreasing step to the beam diameter adjusting means 64. The diameter decreasing step is performed in the following manner. First, the control means 8 operates the pulse motor 645b constituting the moving means 645 of the beam diameter adjusting means 64 to move the movable base 644 mounting the second lens 642 thereon toward the first lens 641 (leftward as viewed in FIG. 2) by a distance of 1 mm, for example. After thus moving the second lens 642 toward the first lens 641, the control means 8 operates the pulse motor 732 constituting the moving means 73 of the optical path length changing means 70 to move the imaging means 69 to the first detecting position A and the second detecting position B, respectively, and then perform the beam diameter detecting step at these positions A and B. Thereafter, the control means 8 checks whether or not the beam diameter φA and the beam diameter φB obtained in this beam diameter detecting step are equal to each other or in the predetermined relation. If the beam diameter φA and the beam diameter φB are equal to each other or in the predetermined relation, the control means 8 determines that the pulsed laser beam oscillated by the pulsed laser beam oscillating means 62 has been corrected to a parallel beam or to have the predetermined relation. Then, the control means 8 stops the operation of the pulsed laser beam oscillating means 62 and operates the pulse motor 662c constituting the moving means 662 of the mirror positioning means 66 to move the mirror supporting member 661 supporting the optical path changing mirror 65 to the operative position shown by the solid line in FIG. 2.

If the beam diameter φA and the beam diameter φB obtained in this beam diameter detecting step are not equal to each other or not in the predetermined relation, the control means 8 operates the pulse motor 645b constituting the moving means 645 of the beam diameter adjusting means 64 to move the movable base 644 mounting the second lens 642 thereon toward the first lens 641 (leftward as viewed in FIG. 2) by a distance of 100 μm, for example. Thereafter, the control means 8 similarly performs the beam diameter detecting step. In this manner, the diameter decreasing step and the beam diameter detecting step are repeated until the beam diameter φA and the beam diameter φB become equal to each other or have the predetermined relation. In the diameter decreasing step to be repeated, the distance to be traveled by the movable base 644 mounting the second lens 642 thereon toward the first lens 641 (leftward as viewed in FIG. 2) is gradually reduced as to 10 μm for the third cycle of the diameter decreasing step and 1 μm for the fourth cycle of the diameter decreasing step.

On the other hand, if the beam diameter φB is larger than the beam diameter φA, the control means 8 determines that the pulsed laser beam oscillated by the pulsed laser beam oscillating means 62 is decreased in diameter. Accordingly, the control means 8 performs a diameter increasing step to the beam diameter adjusting means 64. The diameter increasing step is performed in the following manner. First, the control means 8 operates the pulse motor 645b constituting the moving means 645 of the beam diameter adjusting means 64 to move the movable base 644 mounting the second lens 642 thereon away from the first lens 641 (rightward as viewed in FIG. 2) by a distance of 1 mm, for example. After thus moving the second lens 642 away from the first lens 641, the control means 8 operates the pulse motor 732 constituting the moving means 73 of the optical path length changing means 70 to move the imaging means 69 to the first detecting position A and the second detecting position B, respectively, and then perform the beam diameter detecting step at these positions A and B. Thereafter, the control means 8 checks whether or not the beam diameter φA and the beam diameter φB obtained in this beam diameter detecting step are equal to each other or in the predetermined relation. If the beam diameter φA and the beam diameter φB are equal to each other or in the predetermined relation, the control means 8 determines that the pulsed laser beam oscillated by the pulsed laser beam oscillating means 62 has been corrected to a parallel beam or to have the predetermined relation. Then, the control means 8 stops the operation of the pulsed laser beam oscillating means 62 and operates the pulse motor 662c constituting the moving means 662 of the mirror positioning means 66 to move the mirror supporting member 661 supporting the optical path changing mirror 65 to the operative position shown by the solid line in FIG. 2.

If the beam diameter φA and the beam diameter φB obtained in this beam diameter detecting step are not equal to each other or not in the predetermined relation, the control means 8 operates the pulse motor 645b constituting the moving means 645 of the beam diameter adjusting means 64 to move the movable base 644 mounting the second lens 642 thereon away from the first lens 641 (rightward as viewed in FIG. 2) by a distance of 100 μm, for example. Thereafter, the control means 8 similarly performs the beam diameter detecting step. In this manner, the diameter increasing step and the beam diameter detecting step are repeated until the beam diameter φA and the beam diameter φB become equal to each other or have the predetermined relation. In the diameter increasing step to be repeated, the distance to be traveled by the movable base 644 mounting the second lens 642 thereon away from the first lens 641 (rightward as viewed in FIG. 2) is gradually reduced as to 10 μm for the third cycle of the diameter increasing step and 1 μm for the fourth cycle of the diameter increasing step.

As described above, when the beam diameter φA and the beam diameter φB of the pulsed laser beam respectively detected at the first detecting position A and the second detecting position B in the beam diameter detecting step are not equal to each other or not in the predetermined relation, the diameter decreasing step or the diameter increasing step and the beam diameter detecting step are repeated until the beam diameter φA and the beam diameter φB become equal to each other or have the predetermined relation. As a result, the pulsed laser beam oscillated by the pulsed laser beam oscillating means 62 can be corrected to a parallel beam or to have the predetermined relation. After thus correcting the pulsed laser beam oscillated by the pulsed laser beam oscillating means 62 to a parallel beam or to have the predetermined relation, the optical path changing mirror 65 is moved to the operative position shown by the solid line in FIG. 2. As a result, the pulsed laser beam corrected to a parallel beam or to have the predetermined relation can be focused by the focusing means 63 to perform the laser processing.

As described above, the laser processing apparatus in this preferred embodiment includes the beam diameter adjusting means 64 provided between the pulsed laser beam oscillating means 62 and the focusing means 63, the optical path changing mirror 65 for changing the optical path of the pulsed laser beam passed through the beam diameter adjusting means 64 into an optical path toward the focusing means 63, the mirror positioning means 66 for selectively positioning the optical path changing mirror 65 at the operative position where the pulsed laser beam passed through the beam diameter adjusting means 64 is directed toward the focusing means 63 and at the inoperative position where the pulsed laser beam passed through the beam diameter adjusting means 64 is allowed to travel straight toward the detection path 67, the optical attenuating means 68 provided on the detection path 67 for attenuating the pulsed laser beam directed to the detection path 67, the imaging means 69 for detecting the beam diameter of the pulsed laser beam attenuated by the optical attenuating means 68, the optical path length changing means 70 for moving the imaging means 69 along the detection path 67 to thereby change an optical path length, and the control means 8 for controlling the imaging means 69, the beam diameter adjusting means 64, and the optical path length changing means 70. The control means 8 operates the optical path length changing means 70 to move the imaging means 69 to the two positions where different optical path lengths are provided, next operates the imaging means 69 to detect the beam diameters of the pulsed laser beam at the two positions, and next controls the beam diameter adjusting means 64 according to the two beam diameters detected above so that the two beam diameters become equal to each other or have the predetermined relation. Accordingly, the operator is not required to conduct the work for correcting the pulsed laser beam oscillated by the pulsed laser beam oscillating means 62 to a parallel beam or to have the predetermined relation, thereby improving the workability.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser processing apparatus comprising:
   a chuck table for holding a workpiece;
   laser beam applying means for applying a laser beam to said workpiece held on said chuck table, said laser beam applying means having a laser oscillator for oscillating said laser beam and focusing means for focusing said laser beam oscillated by said laser oscillator;
   beam diameter adjusting means provided between said laser oscillator and said focusing means for adjusting the beam diameter of said laser beam oscillated by said laser oscillator;
   an optical path changing mirror for changing an optical path of said laser beam passed through said beam diameter adjusting means into an optical path toward said focusing means;
   mirror positioning means for selectively positioning said optical path changing mirror at an operative position where said laser beam passed through said beam diameter adjusting means is directed toward said focusing means and at an inoperative position where said laser beam passed through said beam diameter adjusting means is allowed to travel straight toward a detection path;
   optical attenuating means provided on said detection path for attenuating said laser beam directed to said detection path, wherein said optical attenuating means only receives said laser beam when said optical path changing mirror is in the inoperative position;
   imaging means for detecting the beam diameter of said laser beam attenuated by said optical attenuating means;
   optical path length changing means for moving said imaging means along said detection path to thereby change an optical path length; and
   control means for controlling said imaging means, said beam diameter adjusting means, and said optical path length changing means;
   wherein said control means operates said optical path length changing means to move said imaging means to two positions where different optical path lengths are provided, next operates said imaging means at said two positions to detect the beam diameters of said laser beam at said two positions, and next controls said beam diameter adjusting means according to said two beam diameters detected above so that said two beam diameters have a predetermined relation.

2. The laser processing apparatus according to claim 1, wherein said predetermined relation of said two beam diameters includes that said two beam diameters are equal to each other.

* * * * *